United States Patent [19]
Suda et al.

[11] Patent Number: 4,634,255
[45] Date of Patent: Jan. 6, 1987

[54] FOCUS DETECTION APPARATUS

[75] Inventors: Yasuo Suda; Akira Ishizaki, both of Yokohama; Keiji Ohtaka, Tokyo; Akira Akashi; Akira Hiramatsu, both of Yokohama, all of Japan

[73] Assignee: Canon Kabushiki Kaisha, Tokyo, Japan

[21] Appl. No.: 741,880

[22] Filed: Jun. 6, 1985

[30] Foreign Application Priority Data

Jun. 13, 1984 [JP] Japan ................................ 59-121137

[51] Int. Cl.⁴ ............................ G03B 3/00; G02B 5/22
[52] U.S. Cl. ...................................... 354/406; 350/1.6; 350/165
[58] Field of Search ................ 354/402, 403, 406–408, 354/436, 482; 350/1.1, 1.6, 165, 166

[56] References Cited
U.S. PATENT DOCUMENTS 4,229,066  10/1980  Rancourt et al. ..................... 350/1.6
4,531,835  7/1985  Oinoue ............................. 354/406 X Primary Examiner—William B. Perkey
Attorney, Agent, or Firm—Fitzpatrick, Cella, Harper & Scinto

[57] ABSTRACT

A focus detection apparatus has a field lens on or in a vicinity of an anticipated focal plane of an imaging lens and a refocusing optical system arranged behind the field lens to focus light beams transmitted through different areas in a pupil of the imaging lens onto a photosensor array to form a secondary image thereon, and detects a focus in accordance with an output signal of the photo-sensor array. A filter which blocks an infrared ray and transmits a visible ray is arranged adjacent to the field lens to prevent degradation of a filtering characteristic which depends on an inclination of a main light impinging to the filter.

14 Claims, 5 Drawing Figures

FOCUS DETECTION APPARATUS

BACKGROUND OF THE INVENTION

1. Field of the Invention

The present invention relates to a focus detection apparatus for a camera, and more particularly to a focus detection apparatus having a filter for blocking an undesired light such as infrared light arranged at a position which causes no affect to a detection light, and a camera body having such a focus detection apparatus.

2. Description of the Prior Art

In a prior art focus detection optical system shown in FIG. 1, a light beam transmitted through an imaging lens 1 is focused on a predetermined imaging plane and then it is vertically split by a field lens 2, a bi-prism 3 and a stop 4, and then the beams are focused onto sensors 6a and 6b on a secondary focal plane by a secondary focusing lens 5 arranged behind the bi-prism 3. The sensors 6a and 6b may be arrays of photoelectric conversion devices such as CCD's and a phase difference between sensor outputs of two images focused on the sensors 6a and 6b is detected by a known focus detection circuit to detect an in-focus state of the imaging lens 1. The photo-electric conversion device such as CCD usually has a peak of a spectrum sensitivity in a long wavelength region of an infrared ray and hence a filter for blocking light in the infrared region is required to correct a specific viewing sensitivity. Numeral 7 denotes an aperture formed in a front plane of the field lens 2. It may be an apertured mask arranged in front of the field lens 2 or a mask formed on the field lens 2.

In such a compact focus detection apparatus which is housed in a camera body, the infrared ray blocking filter may be an absorption type filter such as CM500 (trade name) and arranged in front of the photoelectric conversion arrays or in front of the bi-prism 3. However, since a transmission characteristic of the filter usually changes with the incident angle of light and an intensity of the transmitted light is lowered, precision is also lowered. A light intensity of a light which is transmitted from a peripheral area of the optical system and has a large inclination angle is lower than a light intensity of a light having a small inclination. Therefore, there is an unbalance between those light intensities.

In a reflection type filter having a vapordeposited thin film, a dependency to an incident angle is large. Therefore, when it is arranged at a large incident angle area, a spectrum distribution of an object image deviates from an actual distribution. The reduction of the light intensity, the unbalance of the light intensities and the deviation of the spectrum distribution cause the reduction of the detection precision.

The optical characteristic of the absorption type filter is more stable than that of the reflection type filter but the absorption type filter is apt to be affected by a change of temperature and humidity.

SUMMARY OF THE INVENTION

It is a primary object of the present invention to prevent reduction of a detection precision due to mounting of a filter which blocks an undesired light.

It is another object of the present invention to prevent reduction of a light intensity by selection of a position of a filter which blocks an undesired light.

It is a further object of the present invention to prevent change of a spectrum distribution by selection of a position of a filter which blocks an undesired light.

DETAILED DESCRIPTION OF THE PREFERRED EMBODIMENTS

Figure 1:
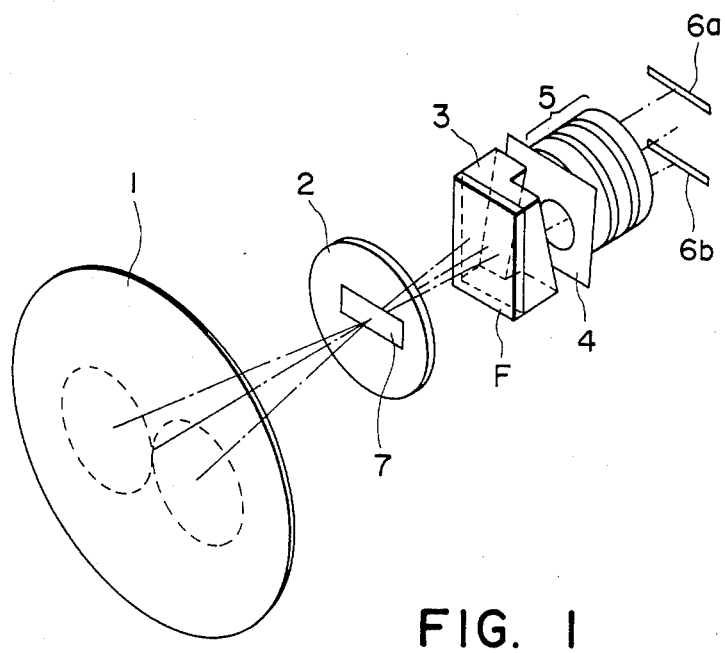
FIG. 1 is a perspective view of a prior art optical system in which an absorption type filter is to be mounted.
Figure 2:
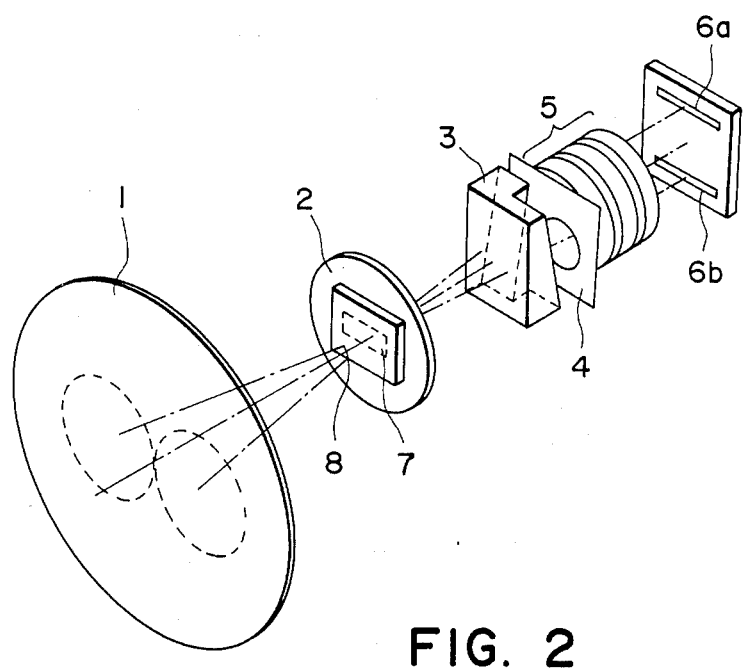
FIG. 2 is a perspective view of an embodiment of the present invention.

FIG. 2 shows one embodiment of the focus detection apparatus of the present invention. A field lens 2 is arranged on or in front of or behind a predetermined imaging plane of an imaging lens 1. By arranging a stop 4 having two apertures in a vicinity of an exit pupil of the imaging lens, when the image is projected in a vicinity of the exit pupil, images of the apertures are split. A reflection type infrared ray-cut filter 8 is arranged in front of the field lens 2. A light beam transmitted through the field lens 2 is vertically split by a prism 3, and the split light beams pass through the stop 4 and are directed to a secondary focusing lens 5 which forms images on photo-sensor arrays 6a and 6b.

Figure 3:
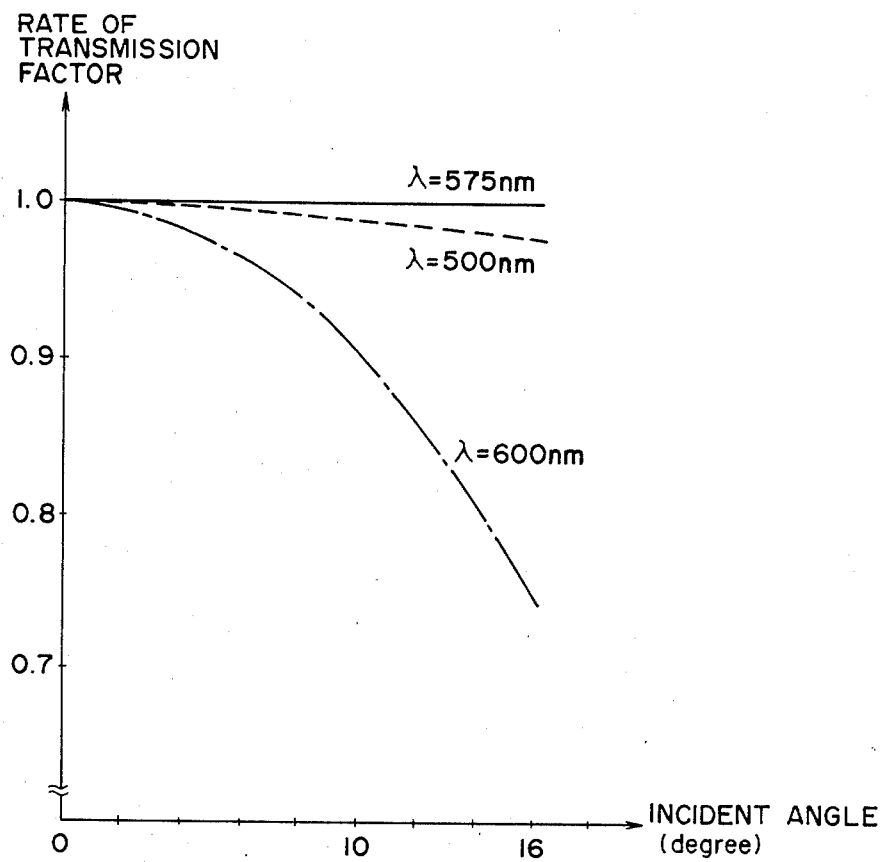
FIG. 3 shows a transmission characteristic curve.

FIG. 3 shows a relation between an incident angle and a transmission factor of the reflection type infrared ray-cut filter 8 used in the present invention. In the filter of this type, the transmission characteristic of the filter 8 changes with the incident angle of light and it also changes significantly with wavelength. As seen from FIG. 3, the smaller the incident angle of light is, the higher is the transmission factor. It is preferable that the incident angle is less than 10 degrees. In FIG. 2, the infrared ray-cut filter is arranged at a position to cause the incident angle of light passing through an end of a distance measurement field to be less than 10 degrees.

In a focus detection apparatus in which an object image focused by an imaging lens of a camera is refocused on a sensor by a focus detection optical system, a projection position of a stop of the focus detection optical system onto the imaging lens is approximately 100–200 mm from a primary focusing plane, the width of a distance measurement view field on the primary focusing plane is 4–6 mm, a distance measurement F-value is 3.5–8, and magnification of the refocusing system is 1.5–0.5. The focus detection optical system is designed to be compact so that it can be housed in a camera body, an incident angle of a principal ray passing through a distance measurement field end or a distance measurement view field image end is minimum between the imaging lens and the field lens.

Figure 4:
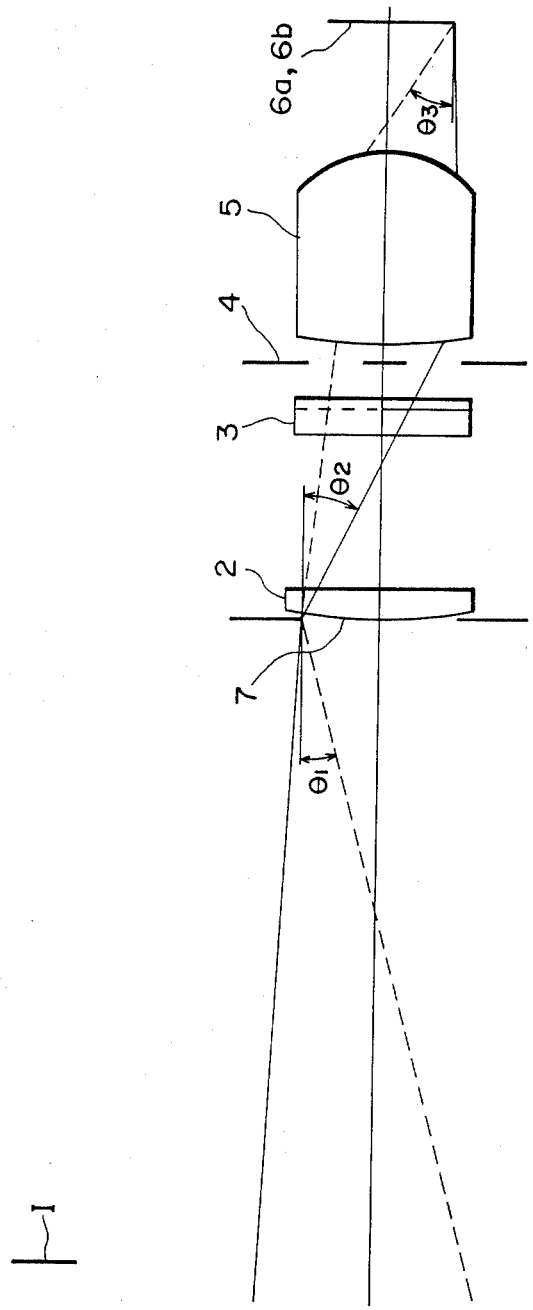
FIG. 4 illustrates optical behavior of a refocusing optical system.

FIG. 4 shows the focus detection optical system of the camera and a light path of the main light. I denotes an exit pupil of the imaging lens. Angle $\theta_1$ to $\theta_3$ to an optical axis indicate incident angle of the principal ray in the focusing plane. $\theta_1$ is the smallest. The infrared ray-cut filter 8 is most preferably arranged between the imaging lens 1 and the field lens 2 and preferably arranged immediately before the field lens 2.

In FIG. 2, the infrared ray-cut filter 8 is arranged in front of the field lens 2. In FIG. 4, the light impinged on the filter 8 is directed to the prism 3 through the aperture 7 of the view field mask which defines the distance measurement field and the field lens 2, deflected upward and downward by the bi-prism 3, and the deflected light beams are directed to the sensors 6a and 6b through the secondary focusing lens 5.

Figure 5:
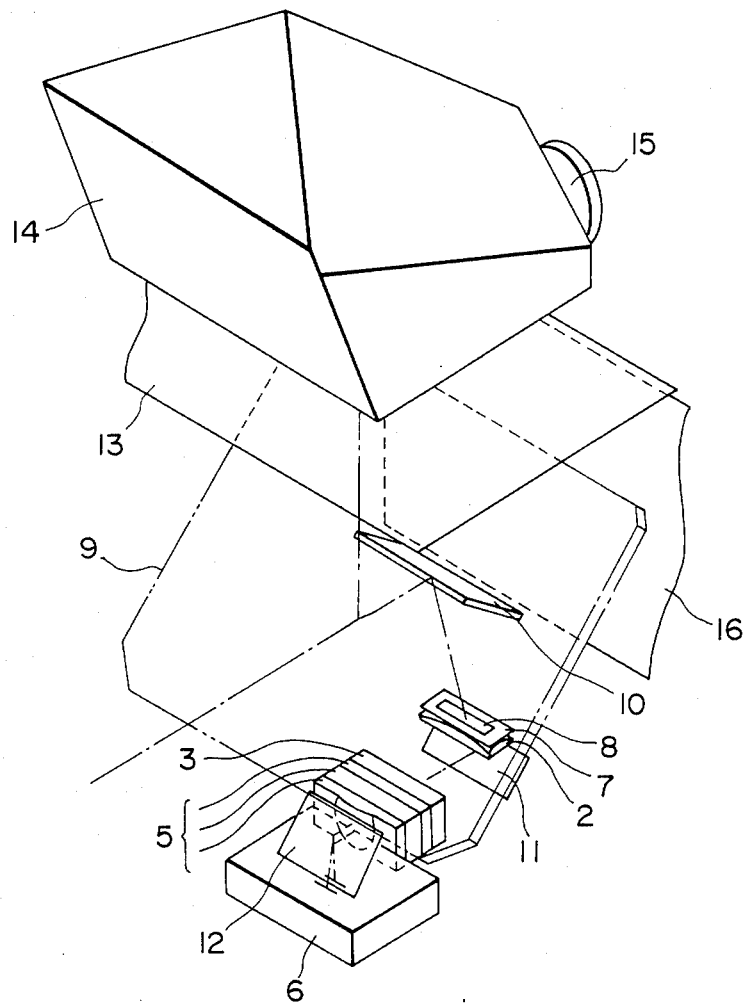
FIG. 5 is a perspective view showing an arrangement in a camera body.

FIG. 5 is a perspective view of the focus detection optical system of the present invention mounted in the camera body. The light beam transmitted through a main mirror (quick-return mirror) 9 is deflected downward of a camera mirror box by a sub-mirror 10 and directed to the filter 8 and focused onto the sensor 6 by the bi-prism 3 and the secondary focusing lens 5 through the field lens 2, mirror 11 and mirror 12. In the finder optical system, the incident light is reflected upward by the main mirror 9 and directed to a penta roof type prism 14 and an eye piece lens 15 through a pint glass 13. Numeral 16 denotes a photograph film.

Instead of arranging the infrared ray-cut filter 8 which is separate from the field lens 2 in the light path, a multi-path film may be coated on the incident plane of the field lens to attain the same effect. In this case, the number of parts is reduced.

In the above embodiment, the refocusing optical system including the bi-prism and the focusing lens is used to form the different images on the sensors 6a and 6b. Alternatively, two focusing lenses having parallel optical axes may be used. In this case, the sensors 6a and 6b are arranged in a line.

As described hereinabove, in the focus detection apparatus of the camera of the present invention, the infrared ray-cut filter is arranged in the vicinity of the side of the field lens facing an object to prevent the reduction of the filtering effect. The reflection type filter is advantageous in cost. Since the filter is arranged off the focus detection optical system, the optical influence such as ghost flare by the reflection on the filter surface is reduced. By arranging the filter in front of the field lens, the affect by the deposited on the predetermined imaging plane is reduced. When the filter is arranged on the front surface of the field lens where the light beam is most converged, the filter area is minimized.

Since the field lens is arranged in the vicinity of the focusing plane, a thermal affect may be anticipated when a highly brilliant object such as the sun is focused. Accordingly the material of the field lens was limited in the past to glass or plastic material having a high infrared ray transmission factor. In the present invention, since the infrared ray is reflected on the front surface of the field lens, the heat generation is low and the the selection range of the material is expanded and the freedom of design increases.

What we claim is:

1. A focus detection apparatus for detecting focus by a light beam transmitted through an object lens, comprising;
   a field lens arranged on or in a vicinity of a predetermined imaging plane of the object lens;
   refocusing optical means for forming a secondary image from a light beam transmitted through said field lens;
   photo-electric conversion means for producing a signal in response to the secondary image; and
   filtering means for cutting an undesired light and having a transmission characteristic which changes with an incident angle of light, wherein the distance between said filtering means and said field lens is less than the distance between said filtering means and said refocusing optical means thereby minimizing the reduction of the intensity of the light transmitted therethrough.

2. A focus detection apparatus according to claim 1, wherein said filtering means includes a layer for cutting infrared rays and transmitting visible light.

3. A focus detection apparatus according to claim 2, wherein said filtering means is a multi-layer interface film.

4. A focus detection apparatus according to claim 1, wherein said filtering means is positioned at the side opposite to the refocusing optical means with the field lens therebetween.

5. A focus detection apparatus according to claim 4, wherein said filtering means is arranged on a surface of the field lens.

6. A focus detection apparatus according to claim 1, wherein said refocusing optical system forms plural secondary images from light beams transmitted through separate areas in a pupil of the imaging lens.

7. A focus detection apparatus according to claim 6, wherein said refocusing optical system has a bi-prism and an imaging lens.

8. A focus detection apparatus according to claim 1, further comprising a mask arranged between said field lens and said filtering means for restricting a view field.

9. A camera body comprising:
   observation means for observing an image of an object;
   image sensing means for sensing the image of the object;
   refocusing image optical means for forming secondary images of different view angles from a light transmitted through a field lens;
   light distribution means for distributing light from an object lens to said observation means, image sensing means and refocusing optical means;
   sensing means for producing a focus detection signal in response to detection of the secondary images; and
   filtering means having a transmission characteristic which changes with an incident angle of light arranged between said light distribution means and said field lens for cutting infrared rays and transmitting visible light such that the intensity reduction of the transmitted light to the actual light intensity is minimized.

10. A camera body according to claim 9, wherein said filtering means is a multi-layer interference film.

11. A camera body according to claim 9, further comprising masking means arranged adjacently to said field lens for restricting a view field.

12. A focus detection apparatus comprising:
   a field lens arranged on or in a vicinity of a predetermined imaging plane of an object lens;
   refocusing optical means for forming a plurality of images having parallax among them from a light beam transmitted through said field lens;
   sensing means for detecting said images to produce a force detection signal;
   masking means arranged adjacently to said field lens and having an aperture for defining a view field; and
   filtering means arranged at a position where principal rays transmitted through the object lens and passing at the edges of said aperture enter into said filter means with an incident angle smaller than 10 degrees, for cutting infrared rays and transmitting visible light.

13. A focus detection apparatus according to claim 12, wherein said filtering means is a multi-layer interference film vapor-deposited on a transparent rigid material.

14. A focus detection apparatus according to claim 12, wherein said filtering means is a multi-layer interference film vapor-deposited on a surface of said field lens.

* * * * *